Aug. 23, 1949.                L. W. MAYS                 2,479,756
                              TOOLHOLDER
                           Filed June 24, 1946
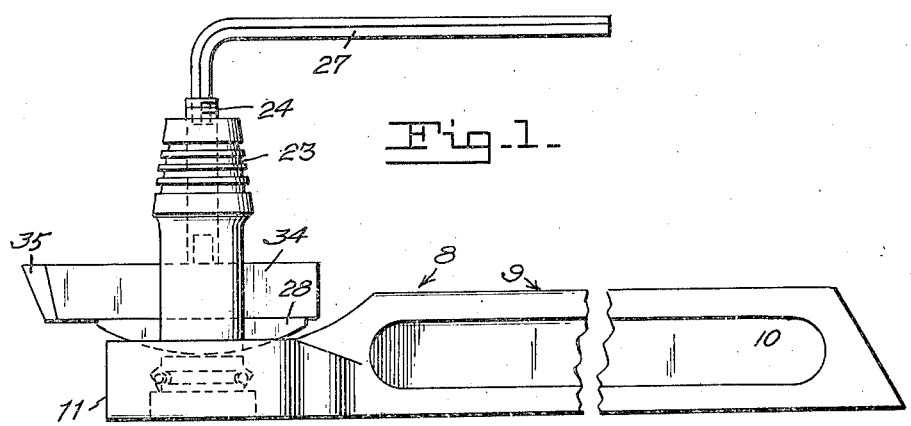
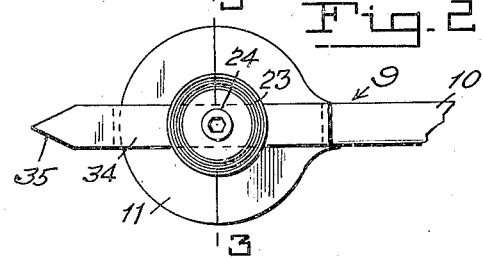
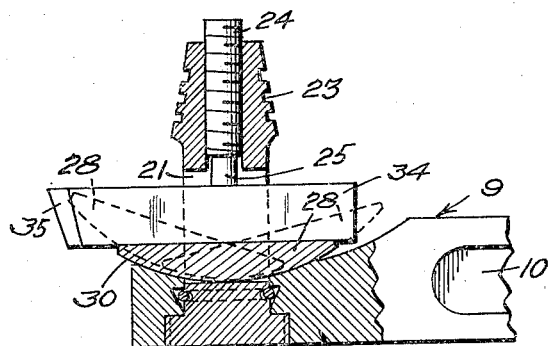
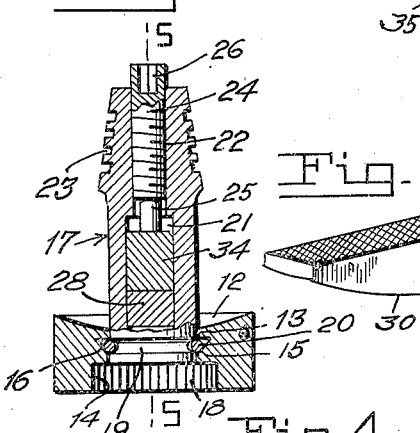
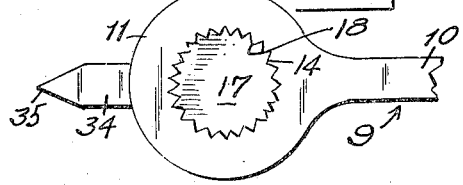
Inventor
Lorney W. Mays.
By *Randolph & Beavers*
Attorneys Patented Aug. 23, 1949

2,479,756

UNITED STATES PATENT OFFICE 2,479,756

TOOLHOLDER

Lorney W. Mays, Tucson, Ariz.

Application June 24, 1946, Serial No. 678,737

3 Claims. (Cl. 29—96)

This invention relates to a novel construction of tool holder for use as an attachment for lathes, shapers and the like.

More particularly, it is an object of the invention to provide a tool holder having a wide range of utility in conjunction with lathes, shapers and the like and which is particularly adaptable for small precision boring and machining operations on tools, dies, instruments etc.

A further object of the invention is to provide a tool holder which is adaptable for receiving tool bits or boring bars which are either round, square or rectangular in cross section and of a variety of sizes, and by means of which the tool bits or boring bars may be adjustably supported at a variety of angles.

Still a further object of the invention is to provide an attachment of the above described character capable of being adjusted in conjunction with a lathe or shaper tool post, in which the attachment is mounted, for quickly and accurately aligning a boring tool, mounted in the attachment, with the axis of the work.

Numerous other objects and advantages of the invention will hereinafter become more fully apparent from the following description of the drawing, which illustrates a preferred embodiment thereof, and wherein:

Figure 1 is a side elevational view of the tool holder;

Figure 2 is a fragmentary top plan view thereof, with the wrench removed;

Figure 3 is a cross sectional view taken along the line 3—3 of Figure 2;

Figure 4 is a fragmentary bottom plan view thereof;

Figure 5 is a longitudinal sectional view taken along the line 5—5 of Figure 3; and Figures 6 and 7 are perspective views of two forms of slippers or tool supports.

Referring more particularly to the drawing wherein like reference characters designate like or corresponding parts throughout the several views, 8 designates generally the tool holder in its entirety which includes an elongated supporting member 9 having a shank 10 at one end thereof and a supporting head 11 at its opposite end. The shank 10 may be of any desired length and is relatively thick and narrow and of the proper cross sectional size and shape to fit a conventional tool post, not shown, of a lathe or shaper. The supporting head 11 is circular in top plan and is provided with a dish or concave top surface 12 and a perpendicular bore 13 which extends through and which opens into the central portion of the dish surface 12 at one end thereof. The opposite end of the bore 13 is enlarged and internally splined as seen at 14. The bore 13, intermediate of its ends, is provided with an enlarged portion 15 including an annular beveled or cammed surface 16 which converges toward the splined end 14.

A tool post, designated generally 17 has its base portion mounted in the bore 13 with the upper portion of the tool post 17 projecting upwardly from the concave surface 12. The base part of the tool post 17 includes a peripherally splined head 18 the spline of which interengages with the spline of the bore portion 14, and an annular grooved portion 19 which is disposed in the enlarged bore portion 15. The groove of the portion 19 contains a spring ring 20 which normally protrudes therefrom and engages the bevel surface 16 to retain the post 17 in engagement with the bore 13. The intermediate portion of the tool post 17 is provided with a diametrical slot 21 which extends lengthwise thereof from approximately a point where the tool post projects from the bore 13 to a point at a substantial distance thereabove, for a purpose which will hereinafter become apparent. The upper end of the tool post 17 is provided with a longitudinally extending internally thread bore 22 which opens outwardly of said end and which opens into the upper end of the slot 21. Externally, the upper end of the tool post 17 is tapered outwardly and is provided with a series of grooves forming a serrated surface 23 to facilitate the manual grasping and manipulation of the tool post 17 relatively to its supporting head 11.

A screw 24 is disposed in the bore 22 and is threaded for engagement therewith. The screw 24 is provided with a restricted shank at its lower, inner end, designated 25, and has an outwardly opening recess 26 at its opposite end which is polygonal shaped in cross section, as seen in Figure 2. A simple wrench 27 of the same cross sectional shape as the recess 26, is provided with a downturned end adapted to engage the recess 26 for turning the screw 24 to advance or retract it relatively to the bore 22.

Referring to Figure 6, 28 designates generally an elongated tool support or slipper having a substantially flat, serrated upper surface 29. The bottom surface 30 of the slipper 28 is bowed longitudinally to form a convex surface having the same longitudinal curvature as the concave surface 12. The slipper 28 is of a width to permit it to be readily inserted into or removed from the slot 21 and yet provide a sufficiently tight engagement to prevent any lateral play therein. Figure 7 illustrates a slightly modified form of the support or slipper, designated generally 31. The bottom surface 32 of the slipper 31 is identical with that of the surface 30 but the top surface thereof is provided with a longitudinally extending substantially V-shaped groove 33, for a purpose which will hereinafter become apparent.

A work engaging tool bit 34 is shown disposed in the slot 21 above the slipper 28 and with the bottom surface thereof resting thereon. The tool bit 34 is of the same width as the slipper 28 to fit in the slot 21 in the same manner as previously described in reference to the slipper or tool support. The screw 24 is adapted to be advanced into the slot 21 by the wrench 27 to cause the lower end of the shank 25 to engage against the bit 34 for clamping the bit between said shank and the serrated surface 29. It is to be understood that the tool bit 34, the outer end of which is tapered to form a cutting edge 35, is intended to illustrate only one of a number of tools or boring bars which may be clamped in the tool post 17, in the manner heretofore described. Further, such tool bits or boring bars may be of a variety of cross sectional shapes. With a tool bit or bar which is round cross section, the tool support or slipper 31 is substituted for the slipper 28 in order that the tool bit or boring bar may be wedged in the groove 33 by the screw 24 to prevent rotation thereof.

The tool supports 28 and 31 may be tilted, as indicated in dotted lines in Figure 5, by moving them lengthwise of the support 9 for mounting the tool bit 34 at an incline to the support 9 to give the "rake" desired in working certain materials or to properly position the tool bit in relation to the axis of the work, not shown, for performing, threading, cutting off operations and the like.

The serrated portion 23 can be manually grasped to force tool post 17 downwardly relatively to the head 11. The downward pressure on the tool post 17 will cause the surface 16 to cam the spring 20 into the groove 19 to permit the splined head 18 to be disengaged from the splined bore 14. The tool post 17 can then be rotated to angularly adjust the slot 21 relatively to the longitudinal axis of the support 9, after which the tool post 17 can be moved upwardly relatively to the head 11 to then cause the splined portions 14 and 18 to interengage for again keying the post to the support 9. In this manner the angle of the bit 34 can be adjusted relatively to the support 9 so that in conjunction with the vertical adjustment of the slipper 28 or 31, previously described, a universal adjustment of the tool bit 34 relatively to the support 9 may be accomplished. The spring 20 in cooperation with the groove 19 and the surface 16 will resiliently retain the tool post 17 in engagement with the supporting head 11.

Various modifications and changes are contemplated and they may obviously be resorted to without departing from the spirit and scope of the invention as hereinafter defined by the appended claims.

I claim as my invention:

1. A tool supporting attachment for lathes or shapers comprising a supporting member having an elongated tool post engaging shank at one end thereof, said supporting member having a circular head at its opposite end provided with a bore extending axially through said head, a tool post mounted in said bore and projecting upwardly from the circular head and provided with a slot extending diametrically therethrough and longitudinally thereof, a tool support mounted in said slot and engaging against one side of the circular head, a tool bit extending through the slot and resting on the tool support, a clamping screw adjustably mounted in the outer end of the tool post and engaging the tool bit for clamping it between said screw and the tool support, means for keying a portion of the tool post in said bore, said bore having an annular groove provided with a beveled bottom surface, said tool post having an annular groove, and a spring ring for resiliently retaining the tool post in keyed engagement with the supporting head, said ring being mounted in the groove of the tool post for resiliently and releasably engaging the groove of the bore and being retractable by engagement with said beveled surface.

2. A tool supporting attachment for lathes or shapers comprising a supporting member having an elongated tool post engaging shank at one end thereof, said supporting member having a circular head at its opposite end provided with a bore extending axially through said head, a tool post mounted in said bore and projecting upwardly from the circular head and provided with a slot extending diametrically therethrough and longitudinally thereof, a tool support mounted in said slot and engaging against one side of the circular head, a tool bit extending through the slot and resting on the tool support, a clamping screw adjustably mounted in the outer end of the tool post and engaging the tool bit for clamping it between said screw and the tool support, means for keying a portion of the tool post in said bore, said bore having an annular groove provided with a beveled bottom surface said tool post having an annular groove, and a spring ring for resiliently retaining the tool post in keyed engagement with the supporting head, said ring being mounted in the groove of the tool post for resiliently and releasably engaging the groove of the bore and being retractable by engagement with said beveled surface, said means for keying the tool post to the circular head comprising an enlarged peripherally splined head on one end of the tool post, and said bore being provided with an enlarged internally splined end for receiving said splined head.

3. A tool supporting attachment for lathes or shapers comprising a supporting member having an elongated tool post engaging shank at one end thereof, said supporting member having a circular head at its opposite end provided with a bore extending axially through said head, a tool post mounted in said bore and projecting upwardly from the circular head and provided with a slot extending diametrically therethrough and longitudinally thereof, a tool support mounted in said slot and engaging against one side of the circular head, a tool bit extending through the slot and resting on the tool support, a clamping screw adjustably mounted in the outer end of the tool post and engaging the tool bit for clamping it between said screw and the tool support, means for keying a portion of the tool post in said bore, and spring means for resiliently retaining the tool post in keyed engagement with the supporting head, said resiliently retaining means comprising an annular groove formed in said tool post, a spring ring in engagement with said groove, and an annular enlargement in the bore of the circular head in which the spring ring normally engages and which is provided with an annular bevel surface against which the spring ring bears.

LORNEY W. MAYS.

REFERENCES CITED

The following references are of record in the file of this patent:

UNITED STATES PATENTS

| Number | Name | Date |
| --- | --- | --- |
| 555,092 | Hammer | Feb. 25, 1896 |
| 687,645 | Mitchell | Nov. 26, 1901 |
| 963,068 | Robinson | July 5, 1910 |
| 979,903 | Van Norman | Dec. 27, 1910 |
| 2,402,353 | Trautmann | June 18, 1936 |